United States Patent Office 3,124,542
Patented Mar. 10, 1964

3,124,542
POROUS REFRACTORY HEAT-INSULATING MATERIAL AND METHOD OF PREPARING SAME
Samuel Kohn, Paris, France, assignor to Office National d'Etudes et de Recherches Aerospatiales, Chatillon-sous-Bagneux, France, a corporation of France
No Drawing. Filed Apr. 21, 1960, Ser. No. 23,601
Claims priority, application France Apr. 25, 1959
14 Claims. (Cl. 260—2.5)

This invention relates in general to heat-insulation and has specific reference to a heat-insulating lining material for coating constructions and apparatus, and also to the method of manufacturing same.

It is known that the protection of bodies, substances and materials against the action of heat constitutes one of the most critical technical problems of present times. As a matter of fact, advancements, developments and achievements are retarded in many technical fields by the distortion or dimensional alteration of parts or structures and also by the impairment or even the destruction of their mechanical strength under the influence of relatively high temperatures. This is observed notably in the case of thermal engines which, for reasons of thermodynamics, must operate at very high temperatures and wherein limits are set in this respect by deformations and destructions to which certain engine components are subjected when the hot gases—flowing in addition at a very high speed—with which they are in contact exceed a certain temperature. This problem is also encountered in the case of aircrafts, missiles and other machines which are heated by their frictional contact with the atmosphere through which they travel, until they are disintegrated or volatilized. Moreover, in these various cases the question of weight is particularly important.

Various methods and means have already been proposed with a view to avoid these drawbacks, and some of them were applied in practice or at least tested. Part of these methods are based on the cooling of the walls to be protected, for example by causing a cold fluid to circulate either within the jacket-forming wall or on one or both sides of this wall, or by spraying a liquid or solid substance, or causing endothermal chemical reactions to take place. Other propositions are based on the use of permanent or wearing heat-insulating materials such as stratified materials impregnated with organic or organo-mineral resins, or special cements or mastics.

Practical applications of these principles, while having a limited efficiency are difficult, costly and complicated to carry out. Thus, up to now the coating or lining of a large-sized part with cellular or non-cellular heat-insulating material constitutes an extremely delicate operation due to the difficulty of machining the lining, fastening same, etc.

It has already been proposed to protect walls and the like with an insulating and wearing material. In this respect the use of a stratified substance is contemplated which consists of fabric made from glass, silica or asbestos, which contains a silicone or phenol resin binder; when this compound material is subjected to the action of gases at a temperature above the melting point of glass, silica or asbestos, the fabric is transformed into a kind of enamel protecting during a more or less extended time period the underlying strata still impregnated with resin. Thus, the erosion process is somewhat retarded but nevertheless takes place at a rate sufficient to render this protection inadequate under severe conditions of operation, that is, if the temperature and the gas flow speed are very high, unless the thickness of the stratified lining is increased to values that are prohibitive in most practical applications.

The use of a cement or mastic containing a more or less refractory filler agglomerated by a binder has also been proposed. Even if a binder having particularly good heat-resisting properties is selected to this end, it will be rapidly destroyed and as the pulverulent filler is no more held together the wall protection disappears. The higher the rate of flow of the gases contacting these cements or mastics, the more this inconvenience is pronounced.

It is one of the essential objects of this invention to provide a method of protecting a body, part, surface or structure against the detrimental effects of high temperatures, and notably against the destructive action of a gas in relative movement with which it is in contact, whether it is the gas itself circulating at a high temperature or its frictional engagement with the body, part or structure that develops the thermal effects, this method being characterized by the following points taken separately or in combination:

(1) The protection is obtained through a sequence of physical, chemical or physico-chemical phenomena—one phenomenon being influenced or not by the preceding one—adapted, as they take place, to put at any moment the body or part under the optimum conditions with respect to the detrimental effects of the surrounding medium, so that it will preserve satisfactory mechanical properties during a time period limited, as a rule, but sufficient for the application contemplated;

(2) It is the very action exerted by the heat—against which the body or part is to be protected—that originates or develops the protective material itself from components deposited on the wall or surface to be protected;

(3) During a first phase, the temperature increase causes the coating thus applied to become porous and therefore to constitute an insulating wall;

(4) This porous state is obtained by means of a viscous medium in which the pore-forming gas is generated, the walls of these pores being hardened as a consequence of the temperature increment resulting from the external effects;

(5) The coating applied initially contains a refractory substance in a state of sufficient division to prevent same from counteracting the transformation of the coating into foam;

(6) As the temperature continues to rise, the refractory particles agglutinate to constitute a porous solid medium forming the refractory lining proper;

(7) This agglutination of the refractory particles is promoted by the other components, or part thereof, or their products of decomposition.

In addition, the method of this invention permits, in the preparation of heat-resisting linings, of utilizing refractory substances resisting to temperatures higher than those supported by the substances that could be used up to now, due to the in situ formation of the lining.

Obviously, the steps of the transformation are set forth hereinabove in a somewhat diagrammatic form and it is quite probable that their actual development is much more complicated, as these steps merge into one another not only in space but also in time, due notably to the fact that the temperatures attained differ considerably in the different zones of the lining, and it is a typical feature of this invention that the outer layers of the lining constitute an efficient protective screen for the inner layers, thus increasing the useful life and efficiency of the assembly.

The thickness of the porous lining developing during the process (this thickness being greater than that of the initial lining), the endothermal character of certain transformations, the insulating property of the gas trapped in the pores, the formation of a limit-layer at the boundary between the outer surface of the lining and the medium in which the body to be protected circulates—the fineness of the protective layer-forming pores contributing in the preservation of an efficient limit-layer and in its continuity—the particularly strong, nearly isotropic structure of the refractory material formed in situ which counteracts the tearing force of a gas circulating at very high speed, all these factors assist in providing a heat protection of a hitherto unattainable and unknown efficiency.

According to a typical form of embodiment of the invention:

(a) The wall to be protected is coated with a layer consisting basically of an organo-mineral resin having incorporated therein a porogenous, that is, pore-forming substance which is thermo-plastic during a first range of temperature from the room temperature up, so that when the temperature causing the gases to be released from the porogenous substance is attained, the resin will have a sufficient but not excessive plasticity adapted to develop a porous or foam material;

(b) A filler of powdered refractory material is mixed with the resin and during the foam formation this material remains equally distributed therein;

(c) As the temperature increases, the resin—of which the strength has increased due to a more pronounced three-dimensional reticulation (thermo-setting-range)—is decomposed and it is a specific feature of this invention that the products of decomposition of this resin tend to reinforce the strong binding of the particles of refractory substance with one another.

From a different point of view, this invention is characterized by the fact that it permits of obtaining a lining consisting of a refractory material capable of resisting to relatively high temperatures, without necessitating the use of high temperatures during its manufacture.

This invention is also remarkable notably in that the means utilized for imparting cohesion to a powdered refractory material is a resin having disappeared at the temperature at which said material normally coheres on account of the partial melting of its particles.

In this respect, the present invention is therefore concerned with a method for obtaining a lining of refractory substance, which consists in mixing this substance with a resin of which the products of decomposition—during the application of heat—reduce the agglutination temperature of the particles constituting said substance. Although the fact that this resin may constitute a non-porous medium is not precluded, this invention refers more particularly and preferably to a resin constituting a foam material, so that the refractory medium consisting of the agglutinated particles of the aforesaid substance will act not only as a refractory material but also as a heat-insulating substance due to the presence of a great number of pores containing a heat-insulating gas, this insulation being advantageous and efficient not only for protecting the wall proper but also for protecting the underlying layers of the lining.

The lining according to this invention will thus have a protective function from several points of view: firstly on account of its persistency owing to the nature of the substance constituting this lining; then, due to its porous character promoting the thermal insulation; furthermore, on account of the presence of a gaseous surface layer acting somewhat like a limit layer and separating the lining from the high-temperature gas of which the detrimental effect is to be counteracted or minimized.

The invention also contemplates of making the body or part designed for supporting the effects of high temperatures from the above-defined material.

The components utilized in the composition of the lining for implementing the method of this invention will now be described in detail, it being understood that this invention does not preclude the prefabrication of elements from the linings of refractory material which have been defined hereinabove, or of a lining considered at a non-final stage of its successive transformations.

(A) *Binder*.—The binder utilized in the composition of the material of this invention must be a compound capable of:

(1) Constituting a coating on the wall to be protected, under such conditions as to keep this application within economical limits; showing good adhesive properties, if necessary after the application of a catching layer; being applied at a relatively low temperature;

(2) Withstanding without inconvenience the mixing with a porogenous substance and also with the refractory filler;

(3) Displaying a sufficient and adequate mechanical strength in the different phases of its utilization;

(4) Having a thermo-plastic character during a first range of temperatures;

(5) Having a viscosity sufficient to permit its transformation into foam due to the action of the porogenous substance at the temperature where this substance becomes operative;

(6) Becoming thermo-setting beyond this temperature;

(7) Remaining stable within a widest possible range of temperatures;

(8) Promoting either by itself or through its heat decomposition products the agglutination of the particles of the refractory substance with one another while maintaining a cohesion sufficient to preserve the structure of a lining until the latter actually consists of the porous material within the solidified refractory material.

Typical examples of compositions meeting these various requirements are:

Organo-boric compounds such as boron-alkyls, anhydrides, acids, and boric, boronic or borinic esters, boramides, amino-borines, borasols and their derivatives;

Organo-phosphoric compounds such as phosphoric, phosphorous, phosphonic, phosphinic anhydrides, acids, esters, amides, imides and imines, phosphonitriles, and their derivatives.

The use of the following substances may also be contemplated to this end:

Organo silicic compounds and notably organo-metallosilicic compounds, silicones; organo-titanic compounds such as titanic esters; organo-tungstenic compounds; organo-germanic compounds; organo-stannic compounds; organo-stannous compounds; organo-glucinic compounds; organo-plumbic compounds; organo-vanadic compounds; organo-ferric compounds (ferrocenes); organic aluminum compounds; organic zirconium compounds; organo-telluric compounds.

(B) *Refractory substance*.—The refractory substance must meet the following requirements:

(1) Of course, it should have the maximum heat-resisting property in consideration of the use contemplated;

(2) It must be capable of being reduced into fine particles to be subsequently mixed with the binder;

(3) The particles must be capable of adhering to one another to constitute a solid porous mass at the temperatures where the binder disappears;

(4) The lining made from this porous mass must withstand erosion at high temperatures.

Typical examples of refractory substances adequate for this use are:

Among the oxides: alumina, glucina, calcium oxide, chromium oxide, hafnium oxide, magnesia, silica, thoria, titanium sesquioxide, zirconium oxide;

Among the nitrides: boron nitride, thallium nitride, titanium nitride, vanadium nitride;

Among the carbides: boron carbide, chromium carbide, hafnium carbide, thallium carbide, titanium carbide, vanadium carbide, zirconium carbide, carborundum;

Among the metals: tantalium, zirconium, tungsten, niobium, chromium.

(C) *Porogenous substance.*—The porogenous component is selected for its property of being capable of existing in the presence of the binder without reacting therewith and of releasing gas only at a temperature at which the binder viscosity is adequate for the formation of pores.

The porogenous component may consist of a solvent for the binder, for example water, alcohol, ketone, or a chlorinated solvent.

It may also consist of an inorganic substance such as ammonium carbonate, sodium nitrite, sodium bicarbonate.

The organic porogenous substances may consist for example of: urea, aminoguanylurea, aminoguanidine; diazoamino derivatives such as diazo-aminobenzene, 1,3 di(oxenyl) triazene, di-paratolyl β oxathylpentazodiene; azo-nitriles, such as azo-isobutyronitrile, azo-hexahydrobenzonitrile; the azoic derivatives of dicarbonic acids such as the diethylester of an azo-dicarbonic acid, azo di-carbonamide; the derivatives of the hydrazine of organic sulfonic acids, such as benzylsulfohydrazide, dinitrosopenta methylene tetramine, the benzyl-mono-hydrazone, dis(imino-amino-methyl) disulfide.

For the purpose of giving those skilled in the art a better understanding of the invention, the following illustrative examples are given:

Example 1

A resin consisting essentially of more or less condensated methylol-phenols is prepared by mixing the following ingredients, if necessary with simultaneous cooling:

Ammonia: .033 mol, in aqueous solution containing 25% of $NH_3$,
Phenol: 1 mol (phenic acid), and
Formic aldehyde: 1.25 mols, in aqueous solution containing from 30% to 35% of aldehyde.

The index of refraction of the mixture is $N_D^{20}=1.44$.

A reflux condensation is carried out in a bath heated at 95° C. The reaction being slightly exothermic the temperature of the whole remains at 98° C.; it is the maturation.

The index of refraction of the mixture becomes $N_D^{20}=1.545-1.550$.

The mixture separates into two layers:
An upper aqueous layer,
A lower layer consisting of the precipitated resin.

The mix is cooled down to 70° C. and decanted in a separating funnel. Thus, a resin having a refractive index $N_D^{20}=1.56-1.57$ is obtained.

This resin is distilled under a 5 to 10 mm. Hg vacuum at 60 to 65° C. Water is separated therefrom in the form of a mixture of water and a water-phenol azeotrope that distills off.

The process is stopped when a crystallization of the phenol in the cooler takes place.

The resin thus obtained has an index of refraction ranging from 1.610 to 1.615 at 20° C. and the quantity of residual water is of the order of 1.5 to 2%.

The filler indicated hereunder is added to 100 g. of this methylol-phenol resin at room temperature or 80° C.:

G.
"Cristalba 40" consisting of electric-molten, crystallized alumina having a 99.5% purity and a particle size of about .5 mm. _____ 217.5
"Alcalba 4" alumina, consisting of calcined (amorphous) alumina having a 99.5% purity and a particle size of a few microns (1 to 10 microns) 42.5 these two products being manufactured by the Ugine works in France.

The mixture is heated in an oven at 80° C. during one hour and then the following ingredients are introduced into the mixture after having removed same from the oven (still at 80° C.) while stirring strongly:

G.
A solution having the following composition:
Water _____ 17.5
Hexamethylene-tetramine _____ 10.0
(The water acting as the porogenous substance and the hexamethylene-tetramine as a hardener.)
Powdered anhydride (molten boric acid) in the proportion of 39 g. per 100 g. of resin,
Finally, 29.6 g. of glycol borate prepared by heating on a moderate flame 15 g. of glycol and 30 g. of boric acid until 15.4 g. of water have been eliminated.

The borate temperature at the time of its admixture is 145° C.

Thus, a coating ready to be applied is obtained.

*Application.*—In order to properly apply the product on a metal surface, the latter is preferably coated beforehand with the basic resin, that is, methylolphenol plastified by the addition of 25% tri-ethylene glycol. The coating is subsequently applied by using a cold metal spatula.

*Stripping.*—If it is contemplated to manufacture lining elements adapted either for a subsequent use or for obtaining a lining on a shaded part, polyethylene constitutes a practical stripping agent.

This invention also contemplates the preparation of a stripping film by spraying onto the die, mold or punch, in the form of an aerosol, a silicone resin for example of the type referenced "B4" and manufactured by the Etablissements E. H. Robert, 6 rue de Verneuil, Paris 7; the film thus obtained is set by heating in an oven; then, a boiling solution of polyethylene in xylene is sprayed onto this film, and the assembly is subsequently heated in an oven at 130° C. If desired, another spraying of polyethylene may be effected on the surface of the film thus obtained, this step being followed by another heating step, and so forth; the last layer of polyethylene sprayed on the coating is not heated.

*Heat treatment.*—The coating thus applied is subjected to the following heat treatment: 4 days at 100° C., then 4 h.30′ at 120° C. A porous material is thus obtained which has a density of about 1.5.

At 100° C. the water steam pressure is high and the viscosity of the mixture is within the range of 20 to 60 poises and with the quantity of water specified the pores thus obtained have the desired size. The boric anhydride, by combining with the excess of water, and the presence of the inorganic filler, constitute factors contributing efficiently to the obtaining of this result.

As the heating is maintained the resin condensation is continued and produces the following reactions: borates (and more particularly metaborates) are formed by the boric anhydride reacting with the methylol-phenols of borates. The glycol metaborate added to the reagents may participate in the formation of metaborates of methylolphenols through exchange reactions between the metaboric ester glycol groups and the methylol radicals; however, it may also remain as a unaltered inclusion within the resin.

Moreover, the extended heating of the resin at 100° C. followed by another heating step but at 120° C. in the presence of boric acids, metaboric acids and boric anhydride, will bring about a reticular structure of the resin due to the condensation of the methylol groups (not converted into metaborates) on themselves. This condensation produces etheroxide groups and even, in some cases, the decomposition products thereof, most probably to diphenyl-methane derivatives.

The boric anhydride, by absorbing the excess water contained in the resin or the water formed during the condensation, will dehydrate the latter while being transformed into metaboric or boric acid.

The porous material thus obtained has a resistance to compression of 38 kilog./square mm. at 20° C. with a density of 1.45.

*Example 2*

In this alternate embodiment of the invention the same sequence of steps as in Example 1 is adhered to but the quantity of water used in twice that indicated. The density of the resulting porous material is lowered to .6. Its resistance to compressive stress is 10 kg./sq.mm.

*Example 3*

The same resin as in Example 1 (which consists essentially of more or less condensated methylol-phenols) is used. 50 g. of kieselguhr are added to 100 g. of resin; the mixture is formed in an oven at 40° C. Then a solution having the following composition is added while stirring strongly:

| | G. |
|---|---|
| Water | 17.5 |
| Hexamethylene-tetramine | 10.0 |

Then 15 g. of ethylene-glycol and finally 40 g. of phosphoric acid are added.

A lining made from the resulting product will rapidly develop into foam by heating. By maintaining the mix at a temperature of 120° C. and 140° C. during 24 hours, the desired hardening is obtained, the porous material having a density of 0.6.

*Example 4*

The same procedure as in Example 3 is adhered to, but the filler consists of the following substances:

| | G. |
|---|---|
| Kieselguhr | 25 |
| Magnesia | 25 |

*Properties.*—The lining made from porous material according to Example 1 will not undergo any appreciable decomposition (or only a very moderate decomposition) up to 500° C.; from 500 to 1,000° C. the resin will gradually decompose. If the temperature rises from 20 to 1,000° C. during three hours, 60% of the resin remains at 1,000° C. About 1,000° C. the alumina particles weld to one another due to the action of the products of decomposition of the resin and from 1,200° C. to 1,800° C. (according to the conditions of the heat application) the lining obtained consists of refractory material, that is alumina, having a very good mechanical strength preserved up to a temperature of about 2,200° C.

*Test.*—A 1.6 mm.-thick duralumin plate referenced "AUG4" and coated with a 4 mm.-thick lining obtained and applied in the manner set forth in Example 1 hereinabove has been submitted to a flame test by using a blow-pipe so adjusted that the flame issuing therefrom is capable of perforating a plate of same thickness but uncoated within 8 seconds; the plate provided with the lining of this invention will resist during 5 to 15 minutes before being perforated by the blowpipe tongue.

What I claim is:

1. A composition for protecting a body against high temperatures comprising a foam-forming resinous component which is thermo-plastic at a first temperature range and which is thermo-setting at a higher temperature range, said component forming a foam at said first temperature range, and a particulate refractory filler distributed throughout said resinous component, the particles of said filler agglutinating at a temperature near the destruction temperature of said resin, said destruction temperature being higher than said higher temperature range, said filler being present in an amount sufficient for said filler to agglutinate when said composition is heated to a temperature sufficiently high to agglutinate said particles, said resinous component comprising a thermo-setting boron containing methylolphenol resin and a pore forming material, and said filler comprising alumina in the ratio of about 260 parts by weight per hundred parts of resin.

2. A composition according to claim 1 wherein said boron containing resin is a methylolphenol borate resin.

3. A composition according to claim 1 wherein the boron containing methylolphenol resin comprises a thermo-setting methylolphenol resin, about 39 parts by weight, to 100 parts of the resin, of powdered boric anhydride, and about 30 parts by weight, to 100 parts of the resin, of glycol borate.

4. A composition according to claim 3 wherein the resinous component contains about 10 parts by weight to 100 parts of the resin of hexamethylene-tetramine as a hardener and between about 17.5 to 35 parts by weight to 100 parts of water, said water causing the resin to foam at said first temperature.

5. An article having a coating thereon for protecting said article against the effects of high temperature, said coating being the composition of claim 1, in the thermo-set state.

6. An article according to claim 5 wherein the boron containing resin comprises a methylolphenol borate resin.

7. A method of preparing a composition comprising providing a methylolphenol resin, incorporation in said resin a particulate refractory filler, then adding water and hexamethylene-tetramine, the water being added in a sufficient amount to cause foaming of the resin upon heating thereof and the hexamethylene-tetramine being added in sufficient amount to cause the resin to thermo-set when heated, then adding about 39 parts by weight, to 100 parts of the resin, of powdered boric anhydride, and then adding about 30 parts by weight to 100 parts of the resin, of glycol borate, said filler comprising alumina in the ratio of 260 parts of filler per hundred parts of resin by weight.

8. A method of preparing a heat-resistant composition comprising the steps of providing a composition containing a foam-forming resinous component which is thermo-plastic at a first temperature range and which is thermo-setting at a higher temperature range, said component forming a foam at said first temperature range, and a particulate refractory filler distributed throughout said resinous component, the particles of said filler agglutinating at a temperature near the destruction temperature of said resin, said destruction temperature being higher than said higher temperature range, said filler being present in an amount sufficient for said filler to agglutinate when said composition is heated to a temperature sufficiently high to agglutinate said particles, heating said composition at a temperature within said first temperature range to cause foaming of the resin while it is in a thermoplastic state and then heating at said higher temperature range to thermo-set the resin, said resinous component comprising a thermo-setting boron containing methylolphenol resin and a pore forming material, and said filler comprising alumina in the ratio of about 260 parts by weight per hundred parts of resin.

9. A method according to claim 8 wherein the composition is heated first at a temperature of about 100° C. and then heated about 120° C.

10. A method according to claim 9 wherein the composition is applied to a base prior to heating and is heated for a few days at a temperature of about 100° C. and then for several days at a temperature of about 120° C.

11. A method according to claim 10 wherein the boron containing resin comprises methylolphenol borate.

12. The composition of claim 1 with the resin in the thermo-set state.

13. A composition for protecting a body against high temperatures comprising a foam-forming resinous component which is thermo-plastic at a first temperature range and which is thermo-setting at a higher temperature range, said component forming a foam at said first temperature range, and a particulate refractory filler distributed throughout said resinous component, the particles of said filler agglutinating at a temperature near the destruction temperature of said resin, said destruction temperature being higher than said higher temperature range, said filler being present in an amount sufficient for said filler to agglutinate when said composition is heated to a temperature sufficiently high to agglutinate said particles, said resinous component comprising a thermo-setting boron containing methylolphenol resin and a pore forming material, and said filler comprising kieselguhr in the ratio of about 50 parts by weight per hundred parts of resin.

14. A composition for protecting a body against high temperatures comprising a foam-forming resinous component which is thermo-plastic at a first temperature range and which is thermo-setting at a higher temperature range, said component forming a foam at said first temperature range, and a particulate refractory filler distributed throughout said resinous component, the particles of said filler agglutinating at a temperature near the destruction temperature of said resin, said destruction temperature being higher than said higher temperature range, said filler being present in an amount sufficient for said filler to agglutinate when said composition is heated to a temperature sufficiently high to agglutinate said particles, said resinous component comprising a thermo-setting boron containing methylolphenol resin and a pore forming material, and said filler comprising kieselguhr and magnesia in the ratio of about 25 parts each by weight per hundred parts of resin.

References Cited in the file of this patent
UNITED STATES PATENTS

| | | |
|---|---|---|
| 2,523,626 | Jones et al. | Sept. 26, 1950 |
| 2,881,088 | Schulenberg | Apr. 7, 1959 |